United States Patent
Phan-Anh et al.

(10) Patent No.: US 7,304,966 B2
(45) Date of Patent: Dec. 4, 2007

(54) ACCESSING IP MULTIMEDIA SUBSYSTEM

(75) Inventors: Son Phan-Anh, Budapest (HU); Robert Sugar, Budapest (HU); Gyorgy Wolfner, Budapest (HU)

(73) Assignee: Nokia Corporation, Espoo (FI)

( * ) Notice: Subject to any disclaimer, the term of this patent is extended or adjusted under 35 U.S.C. 154(b) by 765 days.

(21) Appl. No.: 10/479,457

(22) PCT Filed: Jun. 8, 2001

(86) PCT No.: PCT/EP01/06517

§ 371 (c)(1),
(2), (4) Date: Dec. 2, 2003

(87) PCT Pub. No.: WO02/102107

PCT Pub. Date: Dec. 19, 2002

(65) Prior Publication Data

US 2004/0146040 A1  Jul. 29, 2004

(51) Int. Cl.
*H04Q 7/00* (2006.01)

(52) U.S. Cl. .................. 370/328; 370/356; 455/432.1; 455/435.1

(58) Field of Classification Search ................ 370/328, 370/356, 401, 475; 455/432.1, 432.2, 432.3, 455/435.1
See application file for complete search history.

(56) References Cited

OTHER PUBLICATIONS

Napolitano-Ricagni, "UMTS AII-IP Mobility Management Call Session Control Procedures", Internet Draft, Mar. 24, 2000, XP002149519, pp. 1-24.
Cookson et al, "3G Service Control", BT Technology Journal, vol. 19, No. 1, Jan. 2001, pp. 67-79, XP001006581.
"3rd Generation Partnership Project; Technical Specification Group Services and System Aspects; Architecture Principles for Release 2000 (Release 2000)", 3G TR 23.821 VI.0.1, Jul. 2000, pp. 1-62, XP002175634.

*Primary Examiner*—Lee Nguyen
(74) *Attorney, Agent, or Firm*—Squire, Sanders & Dempsey L.L.P.

(57) ABSTRACT

A method and a system for providing access to an IP multimedia subsystem (IMS) for a subscriber roaming in a visited communication network are described. A subscriber equipment determines that a visited network IMS is not accessible and sends a register message for registering to an IMS to a control entity in the home communication network of the subscriber. The control entity recognizes that the register message is received directly from a subscriber equipment, and an access entity for accessing the IMS of the home network is assigned. Then, the control entity sends a message to the subscriber equipment which message comprises the address of the access entity.

29 Claims, 3 Drawing Sheets

ACCESSING IP MULTIMEDIA SUBSYSTEM

FIELD OF THE INVENTION

The present invention relates to communication networks and in particular to a method and a system for providing access to an IP (Internet Protocol) Multimedia Subsystem (IMS).

BACKGROUND OF THE INVENTION

In the current 3GPP ($3^{rd}$ Generation Partnership Project) architecture a P-CSCF (Proxy-Call State Control Function) is provided by the visited network, where the subscriber is roaming to in both Transport level and IMS level. FIG. 1 shows a P-CSCF in a visited network according to the current 3GPP architecture. This local P-CSCF has connection to the visited Transport Network as shown in FIG. 2. FIG. 2 illustrates a visited IMS built on top of the visited Transport Network represented by GPRS (General Packet Radio Service). Assigning/locating this local P-CSCF is the task of the visited network. For this purpose, two methods are defined in 3GPP:
0. DHCP (Dynamic Host Configuration Protocol) is used to provide a UE (User Equipment) with the domain name of a P-CSCF and the address of a DNS (Domain Name Server) that is capable of resolving the P-CSCF address.
0. A P-CSCF address is transferred within the PDP (Packet Data Protocol) Context Activation signaling to the UE.

In other words, the current P-CSCF discovery methods only work when the visited IMS network comprises a local P-CSCF.

A more detailed description of the current 3GPP architecture is given in [TS 23.228 v5.00 (April 2001)].

However in the early stage of IMS deployment or in case of Alternative Access (i.e. Access Network other than GPRS) there may be the case that IMS subscribers roam into a Transport Network which has no IMS deployed on top of it and so the visited Transport Network cannot provide means to discover a local P-CSCF. Thus, the subscriber cannot access IMS for getting services therefrom.

Not providing IMS services for this kind of subscriber is the easiest way of handling the situation but surely is a great restriction on the business opportunity especially in the early phase of IMS deployment.

SUMMARY OF THE INVENTION

It is therefore an object of the present invention to provide IMS access even for subscribers roaming in a transport network having no IMS domain deployed on top of it.

According to the present invention, this object is achieved by a method according to any one of claims 1 to 8 and a system according to any one of claims 9 to 18.

Moreover, the present invention provides a subscriber equipment and a control entity with improved functionality.

According to the present invention, access is provided to an IP multimedia subsystem (IMS) for a subscriber roaming in a visited communication network. A subscriber equipment (user equipment UE) determines that a visited network IMS is not accessible and sends a register message for registering to an IMS to a control entity (I-CSCF) in the home communication network of the subscriber. The control entity recognizes that the register message is received directly from a subscriber equipment, and an access entity (P-CSCF) for accessing the IMS of the home network is assigned. Then, the control entity sends a message to the subscriber equipment which message comprises the address of the access entity. Then, the subscriber is able to initiate an IMS registration towards the access entity using the address of the access entity.

The access entity may be selected by the control entity or by any other network entity of the home network, the control entity returning the result of the selection to the subscriber equipment.

According to the present invention, a P-CSCF in the Home IMS network can be assigned to the subscriber in case the subscriber is roaming in a network where no IMS domain is deployed, and thus no local P-CSCF is provided.

When the present invention is applied IMS capability is accessible for subscribers roaming into an environment where no local P-CSCF is available.

According to the present invention, a feasible solution for improving accessibility of IMS services especially in early stage of IMS deployment is provided.

The solution according to the present invention can very well be integrated to the current environment according to 3GPP, since it uses much of the current architecture and functionality thereof.

DESCRIPTION OF THE PREFERRED EMBODIMENT

The idea of the present invention is to provide the possibility to locate a P-CSCF for an IMS subscriber even if the subscriber is roaming into a network where IMS domain is not deployed.

Figure 1:
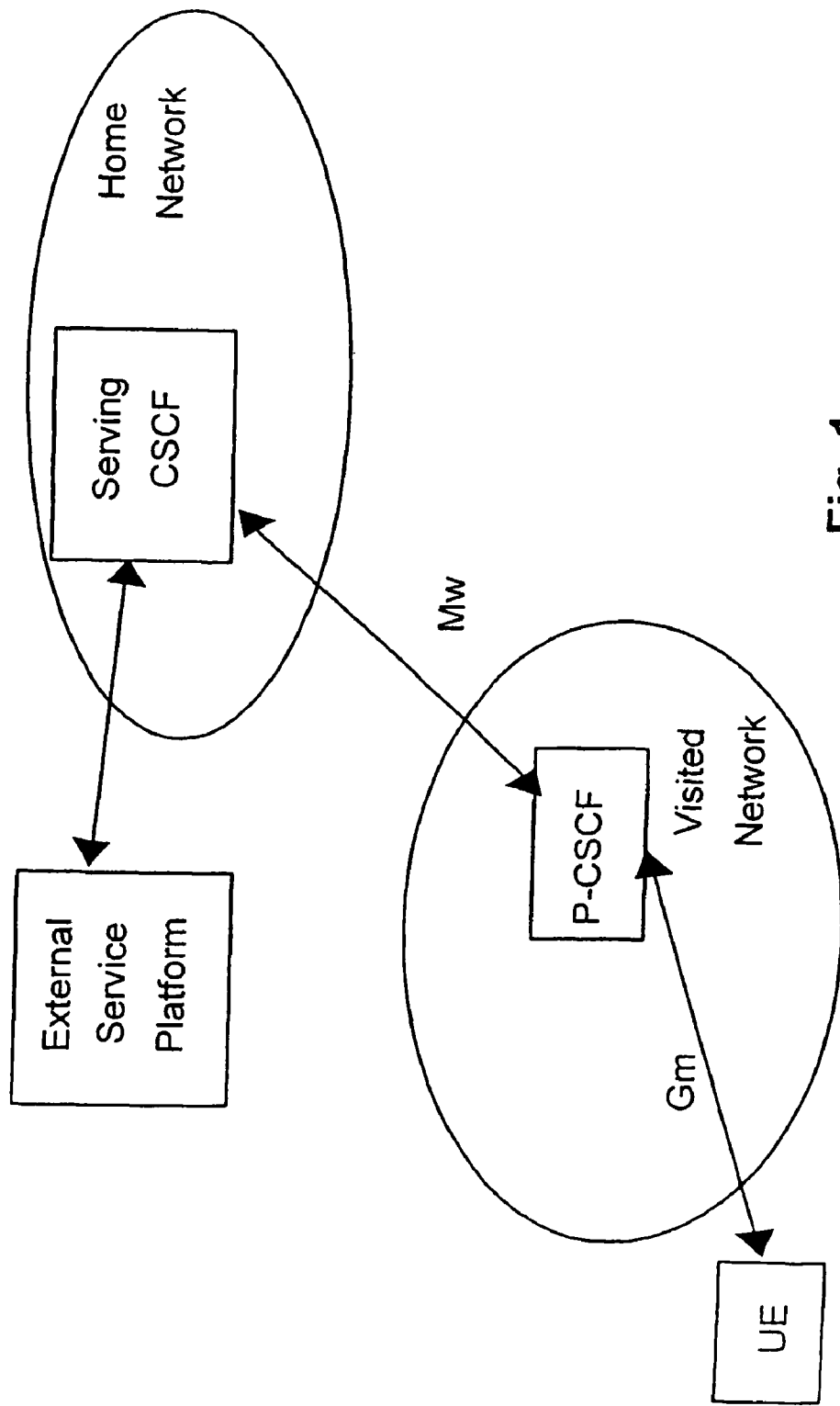
FIG. 1 shows a visited P-CSCF in a visited network according to the current 3GPP architecture.
Figure 2:
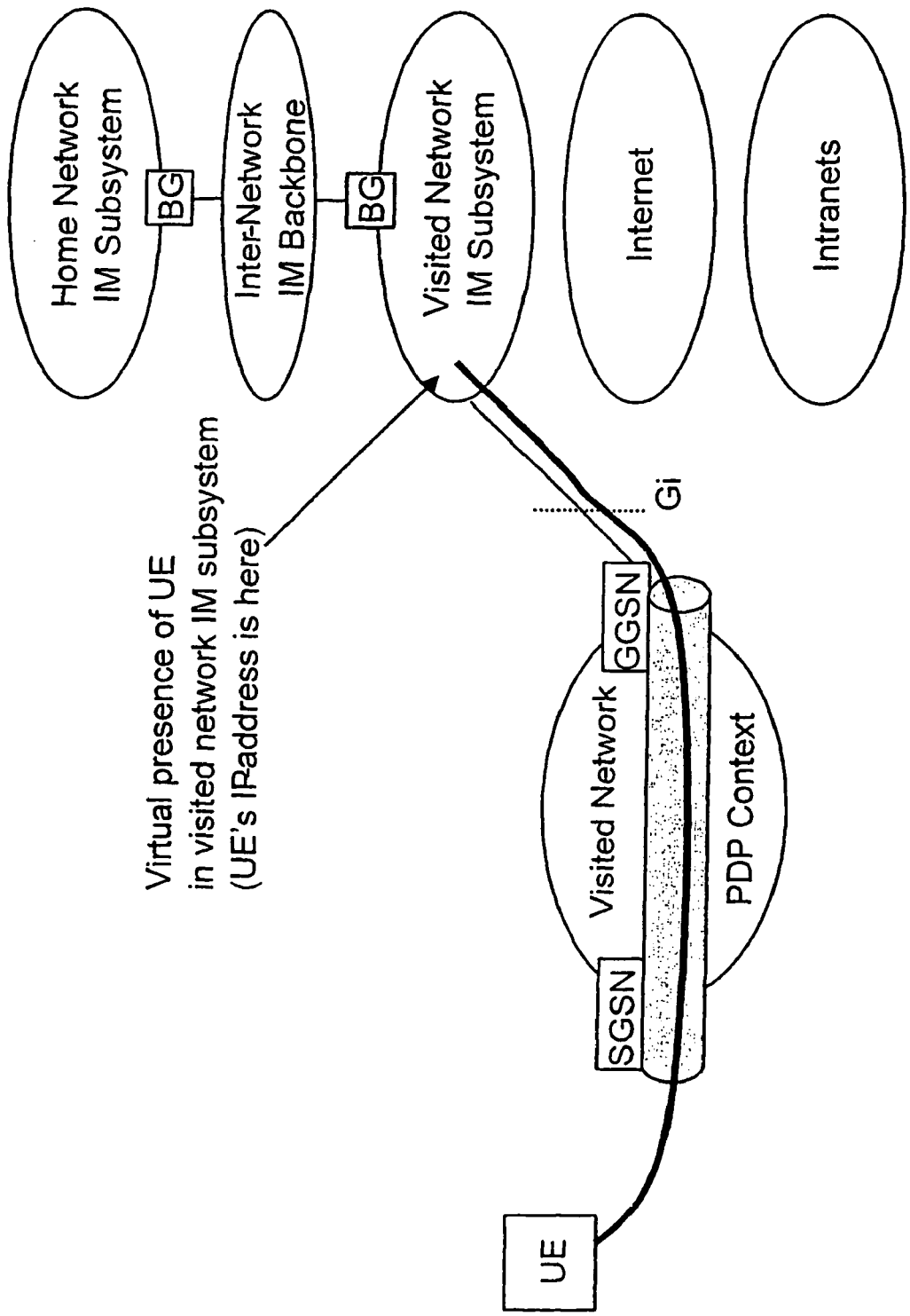
FIG. 2 shows a visited IMS built on top of a visited Transport Network according to the current 3GPP architecture.
Figure 3:
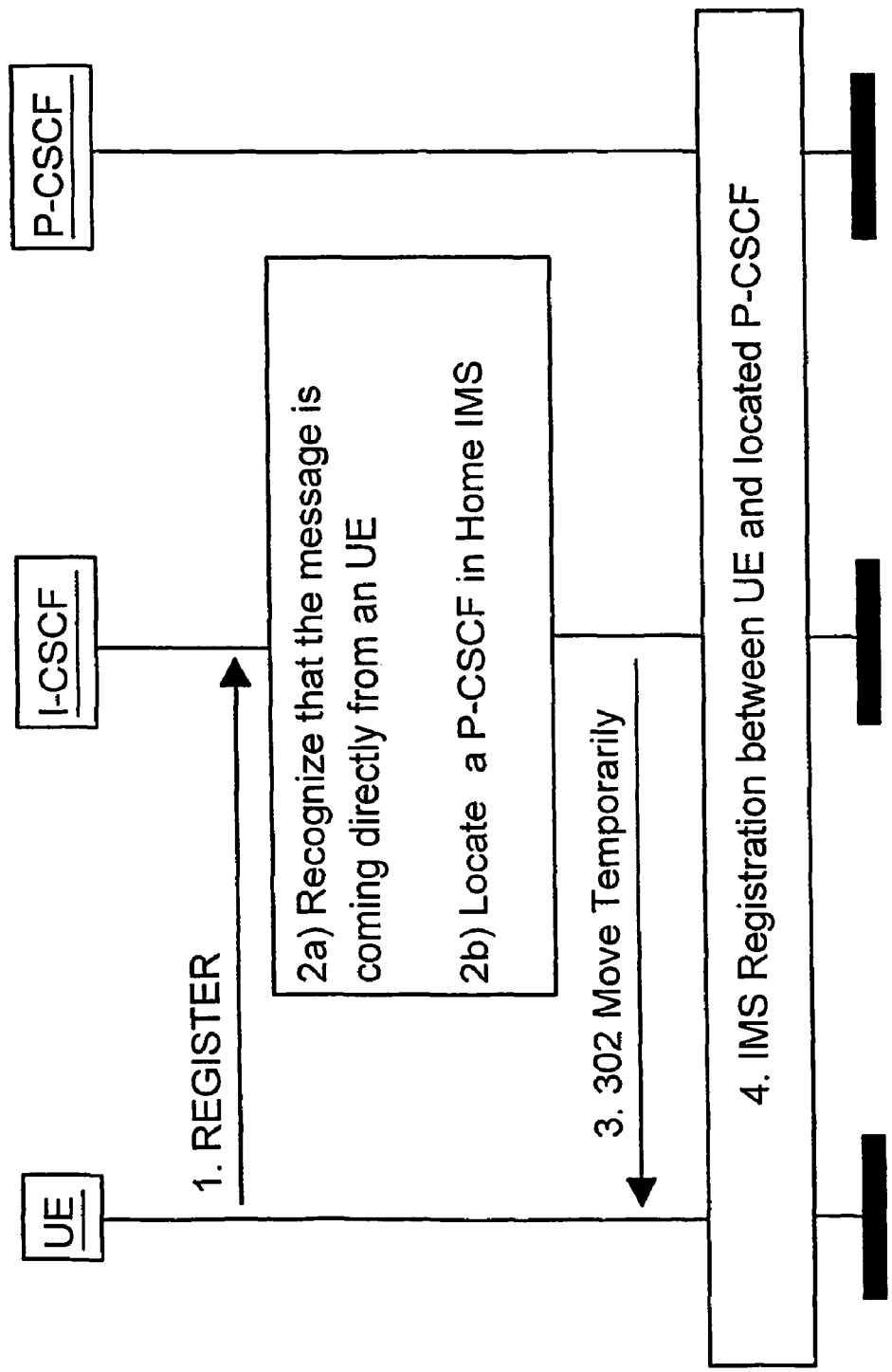
FIG. 3 shows a signaling diagram for locating a P-CSCF during IMS registration according to the present invention.

FIG. 3 shows a signaling diagram for locating a P-CSCF during IMS registration.

When a UE roams in a visited network and recognizes that no local P-CSCF address is provided to it by neither methods defined in the 3GPP architecture, i.e. the visited network has no IMS network deployed, in a step 1, the UE sends a SIP REGISTER message for registering to an IMS directly to an I-CSCF (Interrogating-CSCF) of the home network of the UE. The I-CSCF domain name and the address of a pertinent DNS are well known to the UE so that DNS query can be used to find the address of the I-CSCF. Alternatively, in a less intelligent, implementation, the I-CSCF address can be directly hard-coded into the UE.

In step 2a, the I-CSCF receiving the REGISTER message recognizes that the sender of the REGISTER message is a UE and not a P-CSCF e.g. by detecting that the content of the Contact header is not a P-CSCF name but the address of a UE and/or by detecting that there is no Path header in the message. In a step 2b, the I-CSCF initiates the assignment of a P-CSCF in the Home IMS for the UE. In other words, a distant, P-CSCF in the home network is assigned for the UE.

As the I-CSCF acts as a selector of S-CSCF (Serving-CSCF) in the 3GPP architecture, it has information about the configuration of the network and should be able to locate the P-CSCF in the home IMS network. However, a selection of the P-CSCF is an internal implementation issue and can also be done by another network entity. The I-CSCF then returns the result of the selection to the UE.

In step 3, the I-CSCF sends a SIP (Session Initiation Protocol) 302 Move Temporarily message to the UE containing the location of the P-CSCF as further contact point for the UE. This P-CSCF assignment has a valid lifetime.

Thus, the I-CSCF of the home network acts as a SIP redirect server which redirects the REGISTER message received directly from the UE to the assigned P-CSCF.

In step 4, knowing the P-CSCF address the UE initiates IMS registration to that P-CSCF and the further steps are similar to the IMS registration scenario according to current 3GPP architecture. In other words, after having received the P-CSCF address from the I-CSCF, from the subscriber's point of view most of IMS operation works in a similar way as if the P-CSCF address was obtained conventionally by the visited access network. However the Home IMS provides the functionality normally provided by the Visited IMS in this case.

According to the present invention, the I-CSCF comprises a P-CSCF assignment functionality. Moreover, the I-CSCF is implemented as SIP redirect server which redirects a REGISTER message received directly from a UE to the assigned P-CSCF.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

The invention claimed is:

1. A method of providing access to an IP multimedia subsystem (IMS) for a subscriber roaming in a visited communication network, said method comprising:
   determining in a subscriber equipment that a visited network IMS is not accessible;
   sending a register message for registering to an IMS from the subscriber equipment to a control entity in a home communication network of the subscriber;
   recognizing at the control entity that the register message is received directly from the subscriber equipment;
   assigning an access entity for accessing the IMS of the home network;
   sending a message from the control entity to the subscriber equipment which message comprises the address of the access entity.

2. The method according to claim 1, further comprising:
   initiating an IMS registration by the subscriber equipment towards the access entity using the address of the access entity.

3. The method according to claim 1, wherein the address of the control entity is obtained by the subscriber equipment by using a DNS query.

4. The method according to claim 1, wherein the control entity address is directly hard-coded into the subscriber equipment.

5. The method according to claim 1, wherein recognizing comprises:
   detecting that a subscriber equipment address is present in the received register message as sending address.

6. The method according to claim 1, wherein recognizing comprises:
   detecting that mandatory fields set by an access entity in the register message are missing.

7. The method according to claim 1, wherein the assignment of the access entity is initiated by the control entity and the result is conveyed back to the subscriber equipment by the control entity.

8. The method according to claim 1, wherein the messages are SIP messages.

9. A system for providing access to an IP multimedia subsystem (IMS) for a subscriber roaming in a visited communication network, said system comprising:
   a subscriber equipment configured to determine that a visited network IMS is not accessible and configured to send a register message for registering to an IMS to a control entity in a home communication network of the subscriber,
   said control entity being arranged to receive the register message from said subscriber equipment, recognize that the register message is received directly from said subscriber equipment and send a message to said subscriber equipment which message comprises the address of an access entity for accessing the IMS of the home network.

10. The system according to claim 9, wherein said subscriber equipment is further arranged to initiate an IMS registration towards the access entity using the address of the access entity.

11. The system according to claim 9, wherein said subscriber equipment is arranged to perform a DNS query for obtaining the address of said control entity.

12. The system according to claim 9, wherein the control entity address is directly hard-coded into the subscriber equipment.

13. The system according to claim 9, wherein said control entity is arranged to detect that a subscriber equipment address is present in the received register message as sending address.

14. The system according to claim 9, wherein said control entity is arranged to detect that mandatory fields set by an access entity are missing in the received register message.

15. The system according to claim 9, wherein said control entity is further arranged to select the access entity.

16. The system according to claim 9, wherein said control entity is further arranged to initiate the assignment of the access entity by a different entity.

17. The system according to claim 9, wherein said control entity is an I-CSCF in the home network IMS of the subscriber.

18. The system according to claim 9, wherein the access entity is a P-CSCF in the home network IMS of the subscriber.

19. A subscriber equipment in a system for providing access to an IP multimedia subsystem (IMS) for a subscriber roaming in a visited communication network, said subscriber equipment being arranged to determine that a visited network IMS is not accessible, send a register message for registering to an IMS to a control entity in a home communication network of the subscriber and receive a message from said control entity which message comprises the address of an access entity for accessing the IMS of the home network.

20. The subscriber equipment according to claim 19, being further arranged to initiate an IMS registration towards the access entity using the address of the access entity.

21. The subscriber equipment according to claim 19, being arranged to perform a DNS query for obtaining the address of said control entity.

22. The subscriber equipment according to claim 19, having the control entity address directly hard-coded.

23. A control entity in a system for providing access to an IP multimedia subsystem (IMS) for a subscriber roaming in a visited communication network, said control entity being arranged to receive a register message for registering to an IMS from a subscriber equipment, recognize that the register message is received directly from said subscriber equipment and send a message to said subscriber equipment which message comprises the address of an access entity for accessing the IMS of the home network of the subscriber.

24. The control entity according to claim 23, being located in the home communication network of the subscriber.

25. The control entity according to claim 23, further being arranged to detect that a subscriber equipment address is present in the received register message as sending address.

26. The control entity according to claim 23, further being arranged to detect that mandatory fields set by an access entity are missing in the received register message.

27. The control entity according to claim 23, being further arranged to select the access entity.

28. The control entity according to claim 23, further being arranged to initiate the assignment of the access entity by a different entity.

29. The control entity according to claim 23, being an I-CSCF in the home network IMS of the subscriber.

* * * * *